E. SAYRE.
DEVICE FOR HOLDING MATERIAL FOR CLEANING WALL PAPER, CEILINGS, &c.
APPLICATION FILED MAR. 3, 1914.

1,111,499.

Patented Sept. 22, 1914.

Inventor
Eliza Sayre

UNITED STATES PATENT OFFICE.

ELIZA SAYRE, OF FONDA, IOWA.

DEVICE FOR HOLDING MATERIAL FOR CLEANING WALL-PAPER, CEILINGS, &c.

1,111,499. Specification of Letters Patent. Patented Sept. 22, 1914.

Application filed March 3, 1914. Serial No. 822,202.

*To all whom it may concern:*

Be it known that I, ELIZA SAYRE, a citizen of the United States, residing at Fonda, in the county of Pocahontas and State of Iowa, have invented certain new and useful Improvements in Devices for Holding Material for Cleaning Wall-Paper, Ceilings, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for holding material for cleaning wall paper, ceilings, etc., and the object in view is to produce a simple and efficient device of this nature forming means whereby the plastic doughlike material, which is used for the purpose, may be conveniently handled.

My invention comprises various details of construction, combinations and arrangements of parts which will be hereinafter fully described, shown in the accompanying drawings and then specifically defined in the appended claim.

Figure 1:
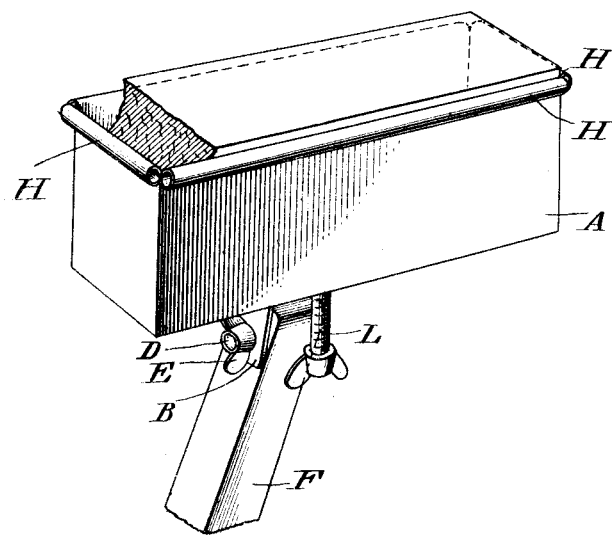
Figure 2:
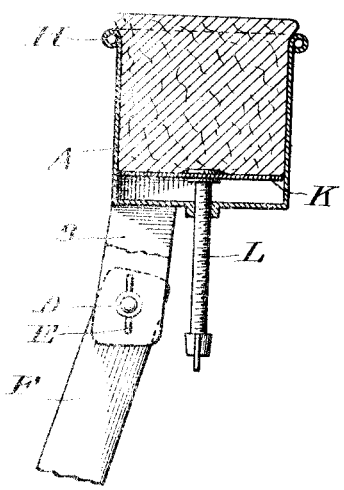
Figure 3:
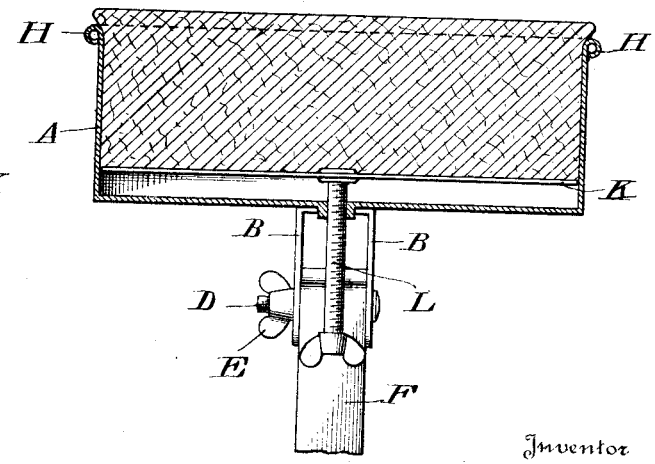

I illustrate my invention in the accompanying drawings, in which:

Figure 1 is a perspective view of the device. Fig. 2 is a cross sectional view, and Fig. 3 is a longitudinal sectional view.

Reference now being had to the details of the drawings by letter, A designates a receptacle which may be of any size or shape, preferably rectangular, and is provided with resilient lugs B which are spaced apart and are apertured for the reception of a bolt or screw D upon which a winged nut E is mounted, affording means whereby the screw may be passed through a handle F and, by the tightening of the thumb screw, cause the lugs to clamp and hold the receptacle in an adjusted position at different angles to the handle as may be desired for convenience in cleaning walls and ceilings of rooms.

In order that the open edges of the receptacle may not mar the wall, they are turned into rolls H as shown. A follower, designated by letter K, is mounted within and conforms to the size of the opening in the receptacle and is swivelly mounted upon an adjusting screw L which is mounted in a threaded aperture in the bottom of the receptacle, said thumb screw having a winged head for convenience in turning the same.

The material which is utilized for cleaning the wall and which material is of a consistency of dough is placed within the receptacle with the follower turned down toward the bottom of the latter. As the material wears away from usage, the follower may be raised within the receptacle to feed a fresh supply so that it will project beyond the open edges of the receptacle. This operation may be repeated until the entire contents of the receptacle has been used.

In operation, the material which projects out of the open receptacle is held against the wall or ceiling and rubbed back and forth over the same, the soil being either absorbed or wiped from the wall or ceiling.

What I claim to be new is:

In combination with a receptacle having its outer marginal edge turned to form a roll, a wall cleaning member mounted within the receptacle and having its outer end flaring and bearing against said rolled portion, a follower movable within the receptacle, a bracket member secured to the receptacle and having arms which are provided with oppositely disposed apertures, a pivotal screw mounted in said apertures and a handle pivoted upon the screw, said receptacle having a boss projecting about an opening therein, and a screw mounted within said opening and swiveled to said follower.

In testimony whereof I hereunto affix my signature in presence of two witnesses.

ELIZA SAYRE.

Witnesses:
ZOLA SAYRE,
E. H. FAIRBURN.